United States Patent
Harwood, II et al.

(10) Patent No.: US 12,149,296 B2
(45) Date of Patent: Nov. 19, 2024

(54) METHOD AND APPARATUS FOR ESTIMATING ELECTROMAGNETIC ENVIRONMENTAL EFFECTS ON RF DEPENDENT SYSTEMS

(71) Applicant: KELLOGG BROWN & ROOT LLC, Houston, TX (US)

(72) Inventors: Theodore Leonard Harwood, II, Hollywood, MD (US); Jerick Craig Black, Lexington Park, MD (US)

( * ) Notice: Subject to any disclaimer, the term of this patent is extended or adjusted under 35 U.S.C. 154(b) by 321 days.

(21) Appl. No.: 17/703,842

(22) Filed: Mar. 24, 2022

(65) Prior Publication Data

US 2022/0337326 A1 Oct. 20, 2022

Related U.S. Application Data

(60) Provisional application No. 63/175,162, filed on Apr. 15, 2021.

(51) Int. Cl.
  *H04B 17/29* (2015.01)
  *H04B 17/21* (2015.01)
  *H04B 17/27* (2015.01)

(52) U.S. Cl.
  CPC .......... *H04B 17/29* (2015.01); *H04B 17/21* (2015.01); *H04B 17/27* (2015.01)

(58) Field of Classification Search
  None
  See application file for complete search history.

(56) References Cited

U.S. PATENT DOCUMENTS

| | | | |
|---|---|---|---|
| 8,229,344 B1 * | 7/2012 | Petersen | H04K 3/94 455/67.11 |
| 2004/0028123 A1 | 2/2004 | Sugar et al. | |
| 2011/0301905 A1 | 12/2011 | Gregg et al. | |
| 2012/0100810 A1 | 4/2012 | Oksanen et al. | |
| 2013/0064328 A1 | 3/2013 | Adnani et al. | |
| 2013/0095848 A1 | 4/2013 | Gold et al. | |

OTHER PUBLICATIONS

S. Cucurachi; A Review of the Ecological Effects of Radiofrequency Electromagnetic Fields (RF-EMF); Environment International 51, I(2013): 116-140. Dec. 20, 2012 (Dec. 20, 2012) Retrieved on Jun. 14, 2022 (Jun. 14, 2022) from <https://.sciencedirect.com/science/article/pii/S0160412012002334> entire document.
Patent Cooperation Treaty, International Search Report and Written Opinion for International Application No. PCT/US2022/021805 mailed Jul. 7, 2022 (7 pages).

* cited by examiner

*Primary Examiner* — Walter J Divito
(74) *Attorney, Agent, or Firm* — Gary M. Machetta

(57) ABSTRACT

The described systems and related test methods provide significant improvement in test accuracy, as well as reduction of test time for Electromagnetic Environmental Effects (E3) system level testing. Systems may include a real time spectrum analyzer, a network analyzer, and a switching/filtering/coupling network controlled by an information processing device, such as a general purpose computer. These systems can scan all frequencies at each receiver.

17 Claims, 7 Drawing Sheets

METHOD AND APPARATUS FOR ESTIMATING ELECTROMAGNETIC ENVIRONMENTAL EFFECTS ON RF DEPENDENT SYSTEMS

CROSS REFERENCE TO RELATED APPLICATION

This application claims priority to U.S. Provisional Patent application having Ser. No. 63/175,162 filed on Apr. 15, 2021 which is incorporated by reference herein.

GOVERNMENT LICENSE RIGHTS

This invention was made with government support under Contract No. N00421-17-F-3000 awarded by the Naval Air System Command, United States Navy. The government has certain rights in the invention.

BACKGROUND

1. Technical Field

Embodiments described herein generally relate to systems and methods for estimating the impact of electromagnetic environmental effects (E3) on radio frequency (RF) dependent systems and sub-systems, and specifically to electromagnetic compatibility (EMC) and electromagnetic interference (EMI) at the platform level.

2. Description of the Related Art

Platform RF source/affected RF component testing is one of several tests utilized to provide certification data that prove to an authorization agency that the platform EMC meets the authorization agency requirements. This testing is sometimes referred to as source/victim testing because the "victim" component has an unintentional and undesirable response to the RF signals transmitted by the source. Such testing provides a structured approach for demonstrating EMC, and if EMI is discovered, the interference can be resolved before operational use. For complex platforms such as aircraft, these tests can be lengthy and costly. These tests include ground operation of every electrical and electronic system while monitoring each electrical and electronic system where EMI could adversely affect the safety of the platform or impair the capability of the platform to perform its mission. The source equipment is operated in modes that are considered worst-case for RF emissions and electromagnetic transient generation. The RF dependent systems are monitored while they operate in modes that are considered most susceptible to RF emissions and electromagnetic transients.

An instrumented radio ground test is a subset of the source/victim component test. This test consists of connecting a spectrum analyzer at the radio antenna port and sweeping the operating frequency of a radio receiver under test, or "victim," for both ambient and source systems operations. All onboard systems are energized but not transmitting. Conventionally, this test is performed in a quiet RF environment (e.g., anechoic chamber). These tests, however, take days to install the instrumentation and can take weeks to take the measurements if used to identify receiver performance under cosite operational conditions.

In certain aspects, the present disclosure addresses the need to estimate the impact of E3 on RF dependent systems and sub-systems more efficiently than in the prior art.

SUMMARY

The present disclosure provides systems and related test methods that provide significant improvement in test accuracy, as well as reduction of test time for Electromagnetic Environmental Effects (E3) system level testing. Generally, systems according to the present disclosure may include a real time spectrum analyzer, a network analyzer, and a switching/filtering/coupling network controlled by an information processing device, such as a general purpose computer. Systems according to the present disclosure may be able to scan all frequencies at each receiver. For example, in less than six seconds, a system according to the present disclosure can scan from 2 MHz to 26 GHz.

In further aspects, the present disclosure provides a method for performing RF source-affected RF receiver testing on a platform having a plurality of RF dependent devices. The method may include: connecting a set of the plurality of RF dependent devices to an RF signal communication network; connecting a plurality of acquisition antennas to the RF signal communication network; connecting a real time spectrum analyzer to the RF signal communication network; continuously monitoring an ambient electromagnetic state at the platform using the real time spectrum analyzer and the plurality of acquisition antennas; operating an RF source to transmit an RF signal, wherein the RF source is one of the RF dependent device in the set; estimating an operating parameter of each RF dependent device in the set using the real time spectrum analyzer; identifying a signal of interest using the estimated operating parameter and the ambient electromagnetic state; and identifying an affected RF dependent device using the signal of interest.

In still further aspects, the present disclosure provides an apparatus for estimating electromagnetic effects (E3) on a platform having a plurality of RF dependent devices. The apparatus may include an RF signal communication network having a plurality of signal carriers, each signal carrier being configured to couple to an associated RF dependent device in the plurality of RF dependent devices, the RF switching and/or filter thereby allowing selective signal communication with each associated RF dependent device; a spectrum analyzer in signal communication with the RF signal communication network and configured to take near-instantaneous wide band measurements of induced RF in the signal carriers coupled to the RF dependent devices; at least one acquisition antenna in signal communication with the RF signal communication network, the at least one acquisition antenna being configured to collect ambient E3 information in at least one frequency range; and an information processor in signal communication with the RF signal communication network, the information processor being configured to generate E3 characterization data using the at least one acquisition antenna and information generated by the real time spectrum analyzer.

In still further aspects, the present disclosure provides an apparatus for estimating electromagnetic effects (E3) on a platform having a plurality of RF dependent devices. The apparatus may include: an RF signal communication network having a plurality of signal carriers, each signal carrier being configured to couple to an antenna of each of the plurality of RF dependent devices, the RF filter thereby allowing selective signal communication with each antenna; a real time spectrum analyzer, in signal communication with the RF signal communication network and configured to take near-instantaneous wide band measurements of induced RF in the signal carriers coupled to the RF dependent devices; a network analyzer in signal communication with the RF signal communication network and configured to measure a operating parameter associated with each RF dependent device of the plurality of RF devices; and an RF amplifier and one or more antennas, the RF amplifier and at least one acquisition antenna cooperating to collect ambient E3 information in at least one frequency range; and an information processor in signal communication with the RF signal communication network, the information processor being configured to generate E3 characterization data using the RF signal acquisition unit, information generated by the real time spectrum analyzer, and information generated by the network analyzer.

In further aspects, the present disclosure provides a method for performing RF source-affected RF receiver testing on a platform having a plurality of RF dependent devices. The method may include the steps of: connecting a set of the plurality of RF dependent devices to an RF signal communication network; estimating an ambient E3 using at least one acquisition antenna and a real time spectrum analyzer; estimating an operating parameter associated with each RF dependent device of the set using a network analyzer in signal communication with the RF signal communication network; and selectively switching between each antenna of each RF dependent device in the set using the RF signal communication network, wherein the ambient E3 and each operating parameter are estimated in a predetermined frequency range and at a selected bandwidth.

It should be understood that examples of certain features of the disclosure have been summarized rather broadly in order that the detailed description thereof that follows may be better understood, and in order that the contributions to the art may be appreciated. There are, of course, additional features of the disclosure that will be described hereinafter and which will in some cases form the subject of the claims appended thereto.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION

Figure 1:
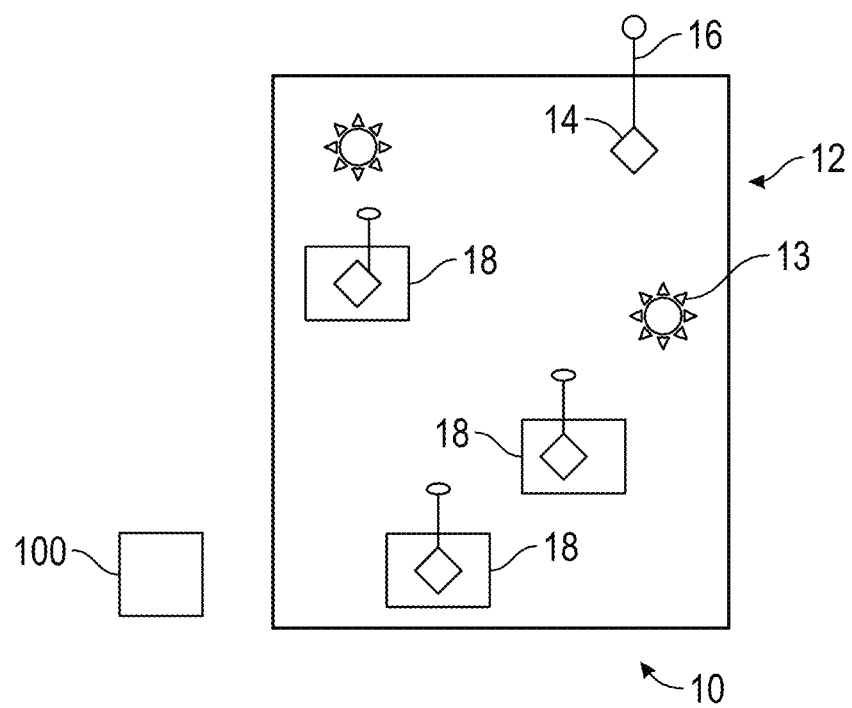
FIG. 1 schematically illustrates a platform having one or more RF sources and one or more RF dependent devices.

Referring to FIG. 1, there is schematically shown a platform 10 on which are positioned a plurality of RF dependent devices 12. During testing, each of these RF dependent devices 12 may function as an RF source that transmits an RF signal that causes interference and also as an affected RF device (or "victim") that is affected by the interference. That is, at different times, a particular RF dependent device may act as an RF source and then an affected device or vice versa. For convenience, FIG. 1 shows some RF dependent devices 12 acting as radio frequency (RF) sources 13 and some RF dependent devices 14 that are affected RF devices. The platform 10 may be mobile; e.g., aircraft, spacecraft, land vehicle, or waterborne vessel. The RF sources 12 are generally any devices capable of emitting RF signals and the RF dependent devices 12 are any devices that may have their operation impaired by such emitted RF signals. In some applications, the RF dependent devices 12 may each have antennas 16 or other similar RF signal receiving component. Additionally, RF shielding 18 may be used to enclose portions of RF dependent devices 12. As further described below, an electromagnetic environmental effects (E3) test system 100 according to the present teachings may be used to estimate E3 effects on the RF dependent devices 12 and well as perform system diagnostics and characterizations. The testing may be performed on a set of the RF dependent devices 12 on the platform 10. The set may consist of all of the RF dependent devices 12 or less than all of the RF dependent devices 12 on the platform 10.

Figure 2:
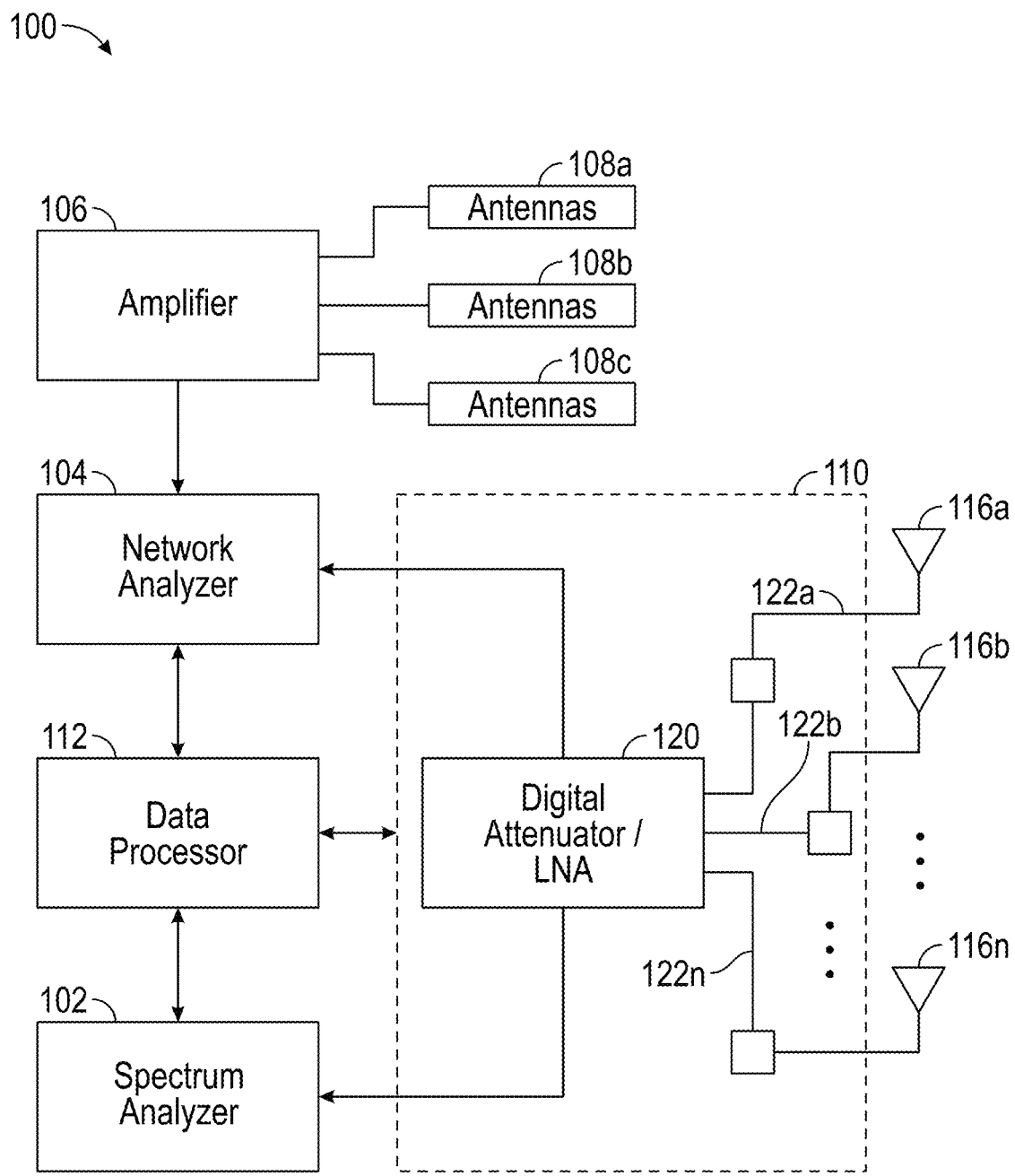
FIG. 2 schematically illustrates an embodiment of an electromagnetic environmental effects (E3) test system according to one embodiment of the present disclosure.

Referring to FIG. 2, there is schematically illustrated one non-limiting embodiment of E3 test system 100 according to the present disclosure. The test system 100 may include a spectrum analyzer 102, a network analyzer 104, an RF amplifier 106; one or more antennas 108a,b,c, an RF signal communication network 110, and a general purpose information processor 112.

The RF signal communication network 110 may be a modular signal communication network configured to allow selective signal communication with couplers 116a,b,n of the antennas 16 (FIG. 1) of the RF dependent devices 12 (FIG. 1). The RF signal communication network 110 may be in selective signal communication with all of the RF dependent devices 12 or less than all of the RF dependent devices 12 on the platform 10. In embodiments the RF signal communication network 110 may include a digital attenuator 120 in signal communication with the couplers 116a,b,n via associated signal carriers 122a,b,n. It should be understood while three couplers 116a,b,n and associated signal carriers 122a,b,n are shown, other embodiments may include less than or more than three couplers 116a,b,n and associated signal carriers 122a,b,n.

In some embodiments, the RF signal communication network 100 may be a switching network. These embodiments may be suitable when extreme low insertion loss is required, signal tolerances are very tight, and the spectrum analyzer is capable of measuring large signals in the vicinity of the measurement of interest without generation of spurious emissions. In some embodiments, the RF signal communication network 100 may be a filtering network. These embodiments may be suitable when the measurements can be relaxed without issue of slightly increased insertion loss and if the spectrum analyzer generates spurious emissions when measuring signals of interest in the vicinity of large adjacent signals. In some embodiments, the RF signal communication network 100 may be a switching network and a filtering network.

The spectrum analyzer 102 may be a real time spectrum analyzer. In embodiments, the spectrum analyzer 102 may be in signal communication with the RF signal communication network 110 and configured to take near-instantaneous (20-50 msec) wide band measurements (160 MHz) of induced RF in the signal carriers 122a,b,n coupled to the RF dependent devices 12 (FIG. 1).

The network analyzer 104 may be a network analyzer. In embodiments, the network analyzer 104 may be in signal communication with the RF filter switching network 110 and configured to measure installed VSWR, amplitude, and phase associated with RF parameters of the RF dependent devices 12.

The RF amplifier 106 and the antennas 108a-c may be configured to estimate ambient EEE. In one non-limiting arrangement, the antennas 108a-c may include a rod antennae configured to collect ambient EEE in the range of 2-MHz to 50 MHz, a log periodic antennae configured to collect ambient EEE in the range of 50-MHz to 500 MHz, and a waveguide horn antenna configured to collect ambient EEE in the range of 500-MHz to 26 GHz.

The information processor 112 may include suitable microprocessors, memory, algorithms, and input devices to control one or more components of the E3 test system 100, e.g., the RF filter switching network 110. The information processor 114 may be programmed with suitable algorithms to process and store information collected by the network analyzer 104 and/or the spectrum analyzer 102.

Figure 3:
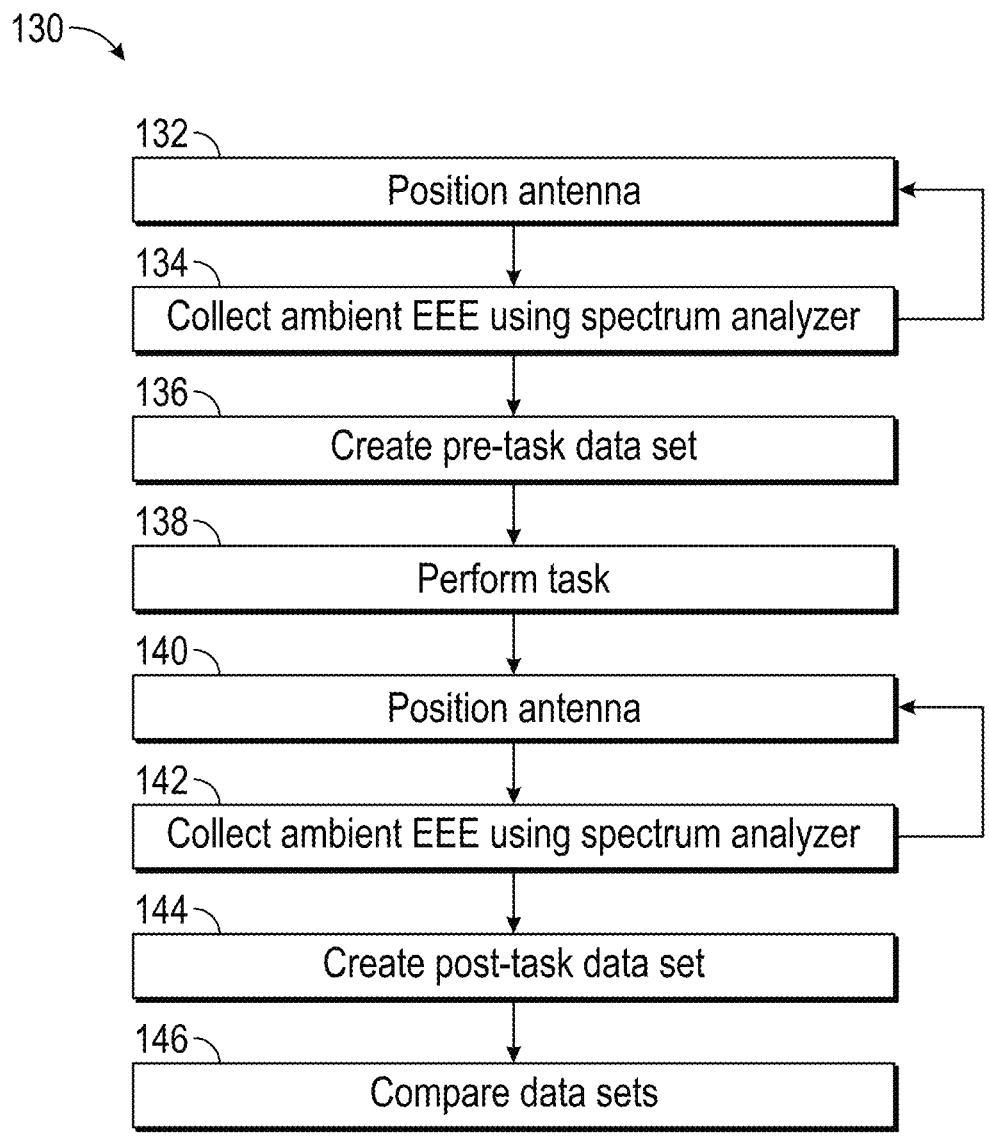
FIG. 3 is a flowchart illustrates an embodiment of a method to perform calibration on a platform having one or more RF sources and one or more RF dependent devices according to one embodiment of the present disclosure.

Referring to FIG. 3, there is shown a non-limiting method 130 for using the test system of FIG. 2 to estimate one or more operating characteristics of the platform 10 of FIG. 1. Referring to FIGS. 1 and 2, at step 132, an antenna, such as antenna 108a, is positioned at a selected location on the platform 10 (FIG. 1). At step 134, the spectrum analyzer 102 is operated to collect ambient EEE data for the RF dependent devices 12 (FIG. 1). Steps 132 and 134 may be repeated by re-positioning the antenna at different locations on the platform 10 (FIG. 1). Steps 132 and 134 may also be repeated using different antennas, e.g., antennas 108b and c. At step 136, a data set is compiled using the measurements of the spectrum analyzer 102.

Such a data set may be a useful when performing one or more tasks on the platform 10 (FIG. 1) such as maintenance, which may unintentionally alter the operating characteristics of the platform 10 (FIG. 1). For example, at step 138, a maintenance or repair may be performed on one or more subsystem of the platform 10 (FIG. 1). After the completion of step 138, the test system 100 may again be used to estimate one or more operating characteristics of the platform 10 of FIG. 1. The positioning and EEE data collection of steps 140 and 142 are generally the same steps 132 and 134 respectively. After repeating steps 140 and 142 at all selected locations and for all antenna configurations, a post-task data set is compiled using the measurements of the spectrum analyzer 102. At step 146 the data sets compiled at steps 136 and 144 are compared and the system and subsystems of the platform 10 (FIG. 1) are tuned, adjusted, or otherwise re-configured as needed.

Figure 4:
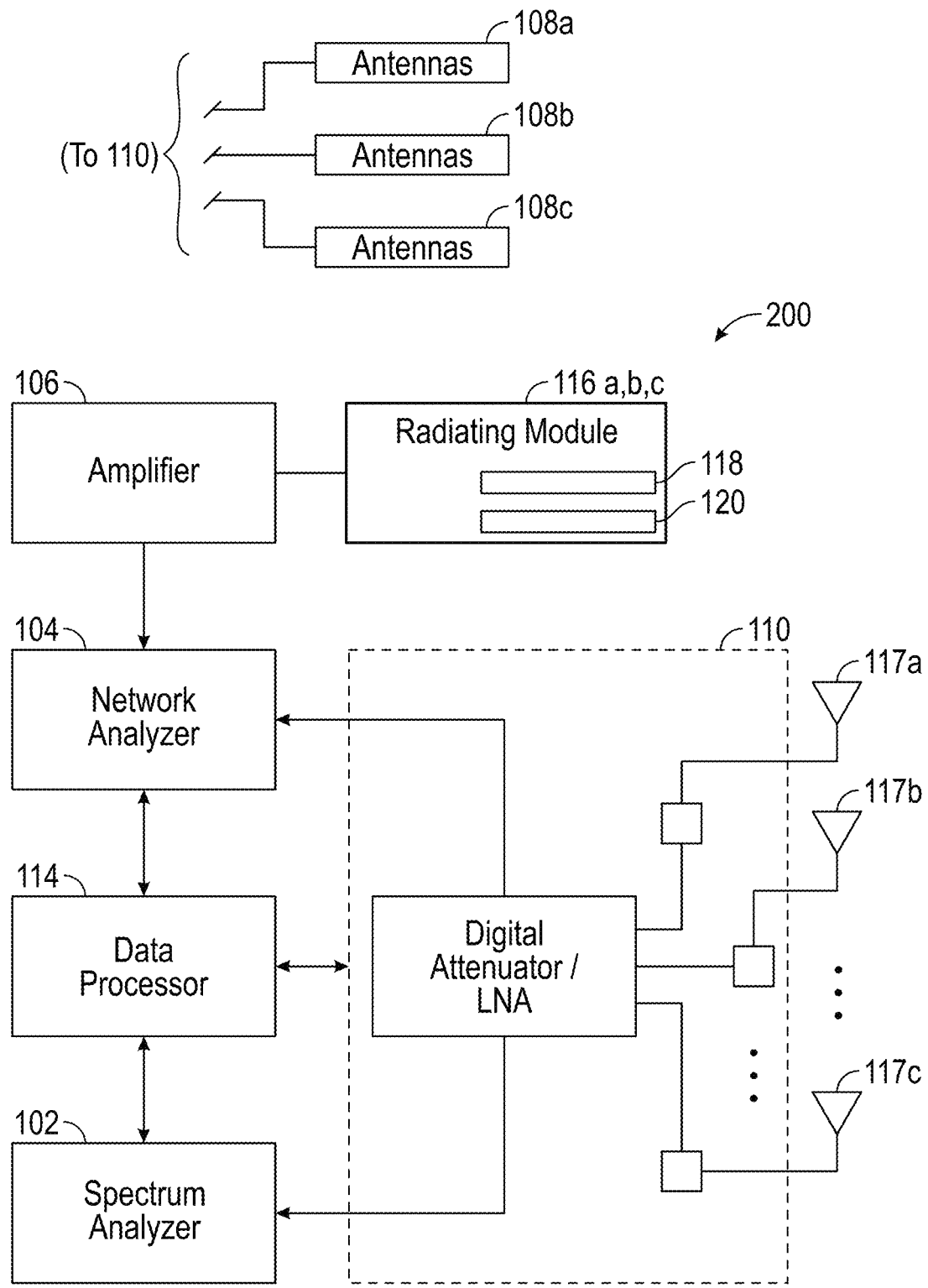
FIG. 4 schematically illustrates an embodiment of an E3 test system according to one embodiment of the present disclosure for evaluating RF shielding effectiveness.

Referring to FIG. 4, there is schematically illustrated one non-limiting embodiment of an E3 test system 200 according to the present disclosure for evaluating the effectiveness of shielding used to enclose a component onboard the platform. The test system 200 may include a spectrum analyzer 102, a network analyzer 104, an RF amplifier 106; one or more ambient antennas 108a,b,c, an RF filter switching network 110, and a general purpose information processor 114. These devices have been described previously. The test system 200 of FIG. 4 also includes one or more radiating modules 116a,b,c configured to emit electromagnetic signals and one or more receiver antennas 117a,b,c that receives the emitted electromagnetic signals. The radiating modules and receiver antennas are paired; e.g., 116a and 117a, 116b and 117b, and 116c and 117c. The signals transmitted and received within the pairs may be used to estimate the effectiveness of shielding from EEE. Each radiating module 116 may include a radiating element 118 and a dummy load 120.

Figure 5:
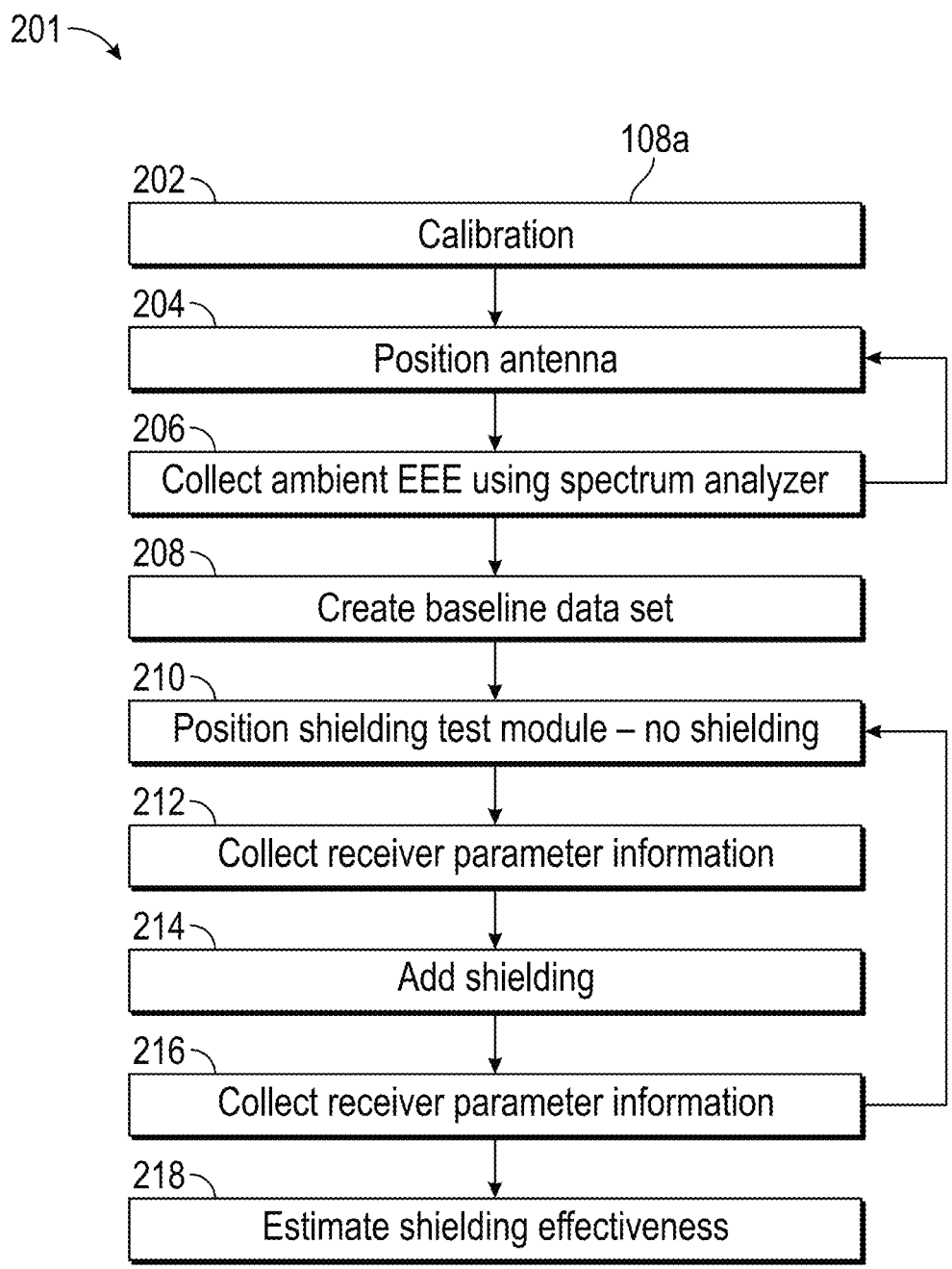
FIG. 5 is a flowchart illustrates an embodiment of a method to test for shielding effectiveness using the FIG. 4 system.

Referring to FIG. 5, there is shown a flow chart illustrating a shielding effectiveness test method 201 that uses the test system 200 of FIG. 4 to evaluate the effectiveness of shielding used to enclose a component of interest. At step 202, a calibration test may be performed as described in connection with FIG. 3. Next, a baseline EEE is determined. At step 204, an antenna is positioned at proximate to the shielding to be evaluated. At step 206, the spectrum analyzer 102 collects data representative of the ambient EEE using the antennas 108a,b,c. Steps 204 and 206 are repeated until data for ambient EEE for all desired frequency ranges have been collected. At step 208, this ambient EEE data may be compiled as a baseline data set. It should be noted that step 208 may be performed concurrent with steps 204 and 206.

At step 210, the radiating module 116a may be positioned inside a shielding structure to be evaluated and a receiving antenna 117a is positioned outside of the same shielding structure. For this step, the shielding panel is removed. Additional pairs of radiating modules 116b,c and receiving antennas 117b,c are similarly positioned at other shielding structures. At step 212, with the shielding panels not present, the test system 100 is energized and sweep is performed over one or more frequency ranges; e.g., 2-MHz to 50 MHz, 50-MHz to 500 MHz, and 500-MHz to 26 GHz. The network analyzer 104 measures and records the response of the antennas 117a,b,c.

At step 214, the shielding panels are installed at all locations to be evaluated for shielding efficiency. At step 216, with the shielding panels present, the test system 100 is energized and sweep is performed over one or more frequency ranges; e.g., 2-MHz to 50 MHz, 50-MHz to 500 MHz, and 500-MHz to 26 GHz. The network analyzer 104 measures and records the response of the antennas 108a,b,c to characterize the electromagnetic signals emitted by the radiating element 118 have passed through shielding.

At step 218, the shielding effectiveness is estimated by comparing the data from step 212 with the data from step 216. Generally, the difference between the EEE measurements taken before and after the shielding is in place represents the effectiveness of the shielding.

In the method described, each shielding location to be tested has a radiating module and receiving antenna, e.g., a radiating module 116a and a receiving antenna 117a. In some variants, a radiating module and a receiving antenna may be moved from one testing location to another testing location. Also, it should be noted that the tests may be performed with the shielding in place first and then removed.

Figure 6:
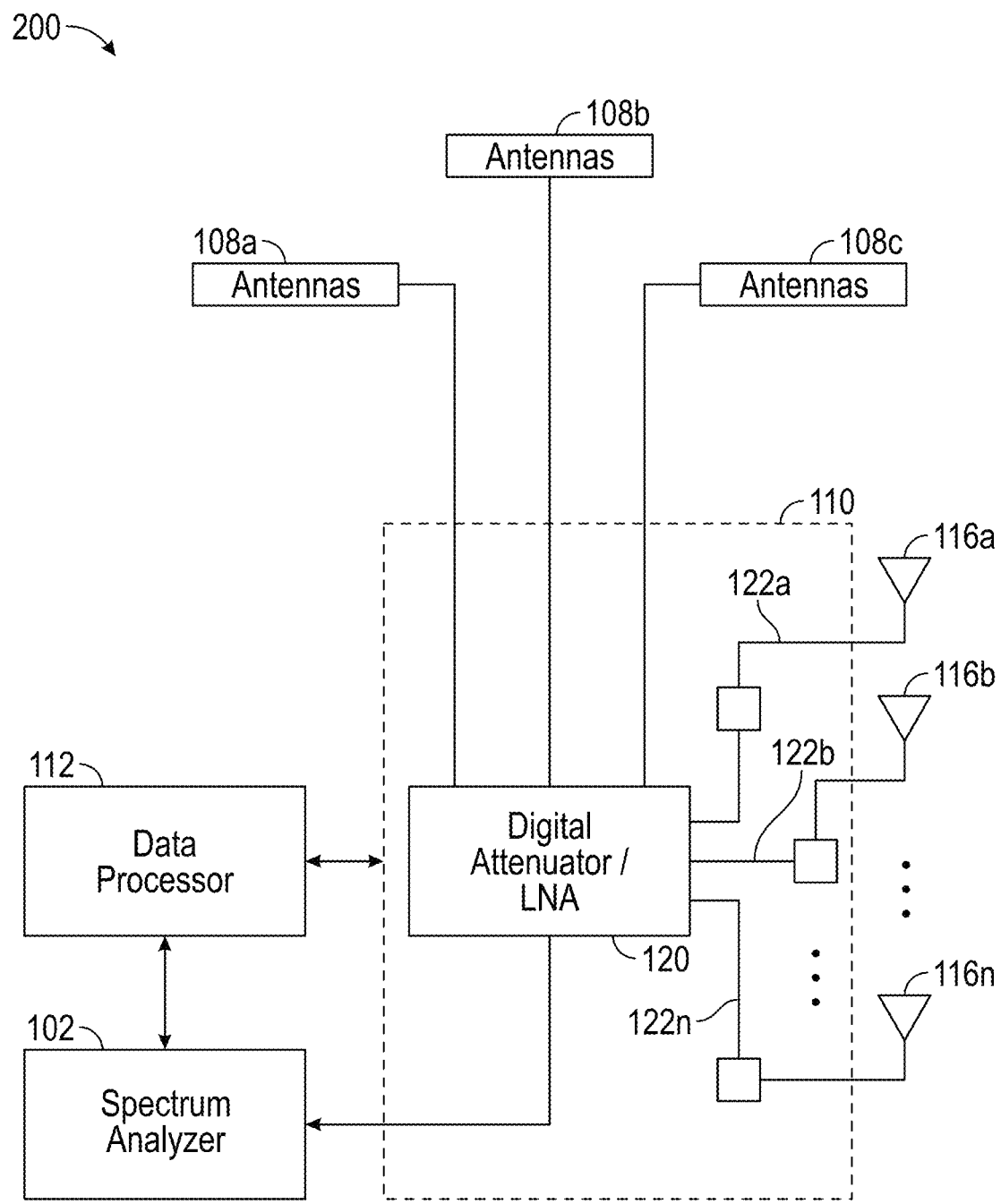
FIG. 6 schematically illustrates an embodiment of an E3 test system according to one embodiment of the present disclosure for evaluating a noise floor for a platform.

Referring to FIG. 6, there is schematically illustrated one non-limiting embodiment of E3 test system 100 according to the present disclosure to estimate a platform noise floor. The test system 100 may include a spectrum analyzer 102, one or more antennas 108a,b,c, an RF signal communication network 110, and a general purpose information processor 112. These devices have been described previously.

Figure 7:
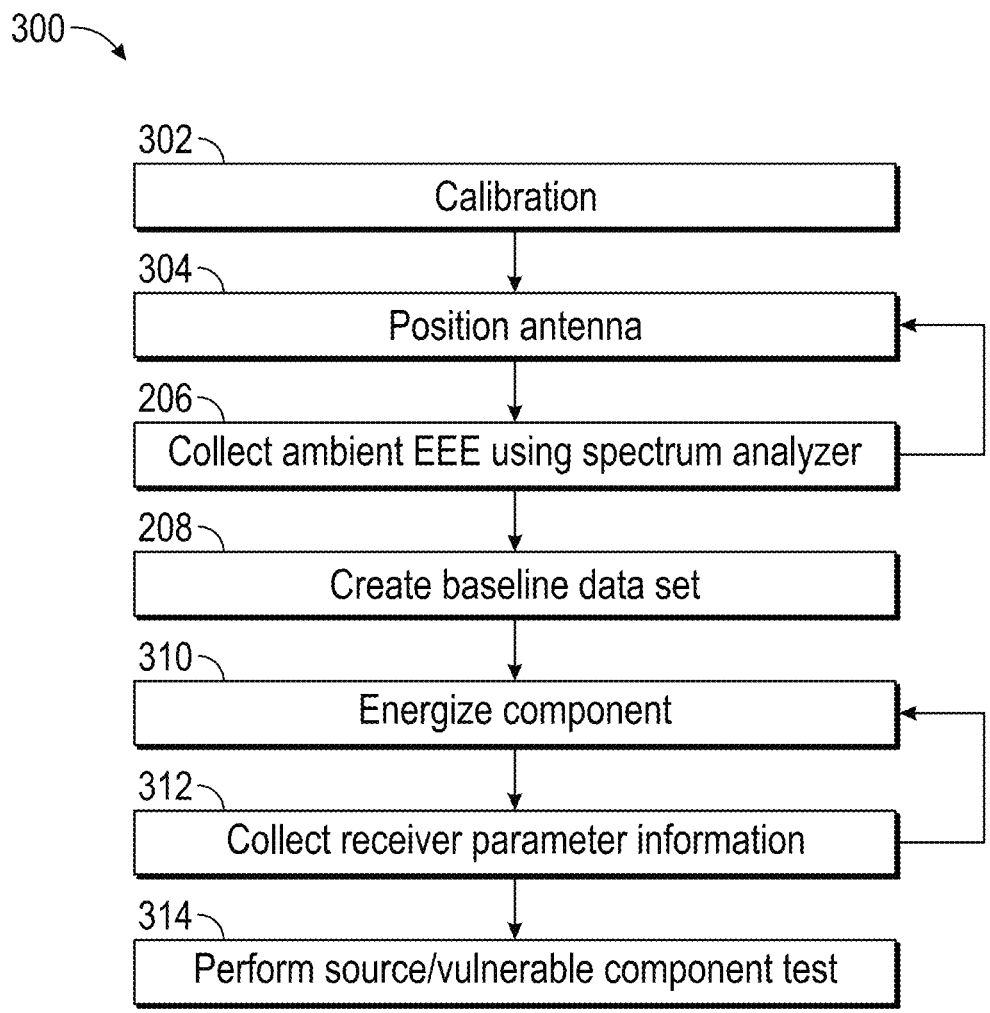
FIG. 7 is a flowchart illustrates an embodiment of a method to identify a change in the RF procedure using the FIG. 6 system.

Referring to FIG. 7, there is shown a flow chart illustrating an RF noise floor estimation method 300 that uses the test system 100 of FIG. 6 to estimate an RF noise floor for a platform of interest. At step 302, a calibration test may be performed as described in connection with FIG. 3. Next, a baseline EEE is determined. At step 304, an antenna configured for a specified frequency range is positioned on the platform. At step 306, ambient EEE is estimated using the spectrum analyzer 102. Steps 304 and 305 may be repeated using differently configured antennae. At step 306, while the spectrum analyzer 102 continues to record, a discrete component of the platform is energized to a desired operating state. At step 308, this ambient EEE data may be compiled as a baseline data set. It should be noted that step 308 may be performed concurrent with steps 304 and 306.

At step 310, a discrete component onboard the platform is energized to a desired operating state while the spectrum analyzer collects EEE data until a steady-state EEE can be established at step 312. Additional discrete components of the platform 10 may be sequentially energized. The spectrum analyzer 102 continually collect EEE data as each of the discrete components is brought to an energized operating state.

At step 314, discrete components may be tested for EEE interference. An operating frequency range for each discrete component may be monitored. Parameters such as fundamental frequencies, harmonics, and spurious emissions may be recorded/monitored and analyzed to identify EMI sources. For example, the system may be tuned to an emission found in a frequency range of a component to determine a level of interference.

In a non-limiting embodiment, step 314 may be a source/affected device (or "source/victim") test that includes the steps of connecting a set of the plurality of RF dependent devices to a signal communication network; connecting a plurality of acquisition antennas to the signal communication network; connecting a real time spectrum analyzer to the signal communication network; continuously monitoring an ambient electromagnetic state at the platform using the real time spectrum analyzer and the plurality of acquisition antennas; operating an RF source to transmit an RF signal, wherein the RF source is one of the RF dependent device in the set; estimating an operating parameter of each RF dependent device in the set using the real time spectrum analyzer; identifying a signal of interest using the estimated operating parameter and the ambient electromagnetic state; and identifying an affected RF dependent device using the signal of interest.

While the foregoing is directed to embodiments of the present disclosure, other and further embodiments of the disclosure may be devised without departing from the basic scope thereof, and the scope thereof is determined by the claims that follow.

What is claimed is:

1. A method for performing radio frequency (RF) source-affected RF receiver testing on a platform having a plurality of RF dependent devices, the method comprising:
    connecting a set of the plurality of RF dependent devices to an RF signal communication network;
    connecting a plurality of acquisition antennas to the RF signal communication network;
    connecting a real time spectrum analyzer to the RF signal communication network;
    continuously monitoring an ambient electromagnetic state at the platform using the real time spectrum analyzer and the plurality of acquisition antennas;
    operating an RF source to transmit an RF signal, wherein the RF source is one of the RF dependent device in the set;
    estimating an operating parameter of each RF dependent device in the set using the real time spectrum analyzer;
    identifying a signal of interest using the estimated operating parameter and the ambient electromagnetic state; and
    identifying an affected RF dependent device using the signal of interest.

2. The method of claim 1, wherein the operating parameter is at least one of: a fundamental frequency, a harmonic, and a spurious emission.

3. The method of claim 1, wherein a plurality of sources is sequentially operated.

4. The method of claim 1, wherein the set includes all of the RF dependent devices on the platform.

5. The method of claim 1, wherein the set includes less than all of the RF dependent devices on the platform.

6. The method of claim 5, further comprising sequentially connecting and energizing each RF dependent device in the set while estimating the ambient electromagnetic state for the platform using the real time spectrum analyzer.

7. The method of claim 1, further comprising estimating the ambient electromagnetic state for the platform while all of the RF dependent devices on the platform are de-energized.

8. The method of claim 1, where in the RF signal communication network includes at least one of: (i) a switching network, and (ii) a filtering network.

9. An apparatus for estimating electromagnetic effects (E3) on a platform having a plurality of RF dependent devices, the apparatus comprising:
    an RF signal communication network having a plurality of signal carriers, each signal carrier being configured to couple to an associated RF dependent device of the plurality of RF dependent devices, the RF signal communication network, allowing signal communication with each associated RF dependent device;
    a spectrum analyzer in signal communication with the RF signal communication network and configured to take near-instantaneous wide band measurements of induced RF in the signal carriers coupled to the RF dependent devices;
    at least one acquisition antenna in signal communication with the RF signal communication network, the at least one acquisition antenna being configured to collect ambient E3 information in at least one frequency range; and
    an information processor in signal communication with the RF signal communication network, the information processor being configured to generate E3 characterization data using the at least one acquisition antenna and information generated by the real time spectrum analyzer.

10. The apparatus of claim 9, where in the RF signal communication network includes at least one of: (i) a switching network, and (ii) a filtering network.

11. The apparatus of claim 9, wherein the operating parameter is at least one of: a fundamental frequency, a harmonic, and a spurious emission.

12. The apparatus of claim 9, further wherein the information processor is configured to estimate the ambient electromagnetic state for the platform while all of the RF dependent devices on the platform are de-energized.

13. The apparatus of claim 9, further wherein the information processor is configured to estimate the ambient electromagnetic state for the platform using the real time spectrum analyzer while sequentially connecting and energizing each RF dependent device in the set.

14. A method for estimating electromagnetic effects (E3) on a platform having at least one RF source and at least one RF dependent device, the method comprising:
    connecting the at least one RF dependent device to an RF filter switching network;

estimating an ambient E3 using at least one acquisition antenna and a spectrum analyzer; and estimating an operating parameter associated with the at least one RF dependent device using a network analyzer in signal communication with the RF filter switching network; and selectively switching between each antenna of the at least one RF dependent device using the RF filter switching network, wherein the ambient E3 and the operating parameter is estimated in a predetermined frequency range and at a selected bandwidth.

15. The apparatus of claim 14, wherein the operating parameter includes at least one of: (i) installed VSWR, (ii) amplitude, and (iii) phase.

16. The apparatus of claim 14, wherein the at least one acquisition antenna includes a plurality of antenna, each of which is selected to collect E3 information in a different frequency range.

17. The apparatus of claim 14, wherein the E3 characterization data provides a baseline RF for the at least one RF dependent device.

* * * * *